United States Patent [19]

Jaeger

[11] 4,075,392
[45] Feb. 21, 1978

[54] ALLOY-COATED FERROUS METAL SUBSTRATE

[75] Inventor: Frederick T. Jaeger, Rosemere, Canada

[73] Assignee: Eutectic Corporation, Flushing, N.Y.

[21] Appl. No.: 728,284

[22] Filed: Sept. 30, 1976

[51] Int. Cl.$^2$ ............................................. B32B 15/18
[52] U.S. Cl. ...................................... 428/457; 427/34; 427/236; 428/678; 428/679; 428/682
[58] Field of Search ................ 427/236, 34; 29/196.3, 29/196.1, 196.6; 75/.5 BC; 428/457, 969, 678, 679, 682

[56] References Cited

U.S. PATENT DOCUMENTS

| 3,326,714 | 6/1967 | Rath | 427/34 |
| 3,378,392 | 4/1968 | Longo | 427/34 |
| 3,455,019 | 7/1969 | Quaas | 427/215 |
| 3,754,968 | 8/1973 | Reznik | 29/196.6 |

*Primary Examiner*—Arthur J. Steiner
*Attorney, Agent, or Firm*—Hopgood, Calimafde, Kalil, Blaustein and Lieberman

[57] ABSTRACT

An alloy-coated ferrous metal substrate is disclosed, the ferrous metal making up said substrate having a thermal conductivity relative to silver taken as 1 cal./sq.cm/cm/° C/sec at substantially ambient temperature of at least about 0.06, the alloy coating being selected from the group consisting of a self-fluxing heat and corrosion resistant iron-group metal-base alloy and a self-fluxing copper-base alloy fused and metalurigically bonded to said ferrous metal substrate, said alloy coating having a thickness of about 0.005 to 0.15 inch, the thermal conductivity of said coating being at least about 0.05.

8 Claims, 4 Drawing Figures

ALLOY-COATED FERROUS METAL SUBSTRATE

This invention relates to alloy-coated ferrous metal substrates and, in particular to ferrous metal substrates having fused and metallurgically bonded self-fluxing iron-group metal-base and copper-base alloy coatings thereon characterized by improved combination of physical and chemical properties, including resistance to heat and corrosion combined with optimum thermal conductivity.

In copending application Ser. No. 672,785, filed Apr. 1, 1976, a boiler tube coating and method are disclosed in which industrial steel tubes or pipes, for example, steel boiler tubes and/or integrated panels of steel boiler tubes, are provided with a fused overlay of a corrosion and erosion resistant coating comprised of a refractory hard component, e.g. tungsten carbide, dispersed through a corrosion resistant matrix alloy.

STATE OF THE ART AND THE PROBLEM

Structural elements of industrial equipment subjected in use to heat and/or corrosion, and/or erosion, including normal wear and tear, such as heat exchanger elements, generally require regular maintenance and care in order to keep the equipment in optimum working condition. Such elements are generally made of ferrous metals (e.g. mild and low alloy steel, cast iron, wrought iron, and the like) and include a variety of structural elements, for example, hoods for the basic oxygen furnace, high temperature baffles, fan blades and liners for ore sintering furnaces, super heater and preheater tubes for boilers employed in power stations and ferrous metal parts in incinerators, among many other industrial equipment parts or structural elements.

Heretofore, it had been the practice to replace the worn, or corroded, or eroded part with a new part and, depending upon its availability from the manufacturer, it was not uncommon for the replacement to take an inordinate amount of time, which adds to the overall maintenance cost. Moreover, the cost of replacement parts has steadily increased due to increasing manufacturing cost, and continuing inflationary pressures.

Attempts at overcoming the foregoing problem have included taking the worn, or corroded, or eroded part and coating it with an erosion, corrosion, heat and oxidation resistant alloy by metal spraying a coating metal onto the surface of the part, followed by fusing of the coating in place.

While these attempts have been beneficial, such coatings did not fulfill all of the requirements of a protective metal coating. For example, ferrous metal substrates, such as cast iron, mild steel, wrought iron, low alloy steel, and the like, generally exhibit a good thermal conductivity for such materials of over about 0.1 cal/sq.cm/cm/° C/sec and ranging as high as 0.2 (wrought iron) which, in many cases, is important where the metal part is in contact with a heat source for a special purpose, e.g. a heat exchanger element.

For example, an attempt was made to coat the surface of a ferrous metal substrate, e.g. cast iron, with a stainless steel overlayer, e.g. with 410 stainless, which was applied by metal spraying. However, this coating did not provide the desired protection and also did not provide the desired properties. For one thing, the coating had an adverse effect on the thermal conductivity which is an important property of heat exchanger surfaces. The heat conductivity of the coating is below 0.06 cal/sq.cm/cm/° C.sec; whereas, the heat conductivity of cast iron is over 0.1. While heat resistant nickel-base alloys are desirable as coatings, most heat resistant nickel alloys exhibit low heat conductivity.

For example, the alloy known by the trademark "Inconel" (13% to 15% Cr, 6% to 8% Fe and the balance nickel) exhibits a thermal conductivity of about 0.035 at ambient temperature, which is substantially below the heat conductivity of cast iron and low alloy steels. A nickel-base alloy containing 60% Ni, 24% Fe and 16% Cr exhibits a thermal conductivity of about 0.032, which is also very low. A cobalt-base alloy containing 25% to 30% Cr, 1.5% to 3.5% Ni, 4.5% to 6.5% Mo, 2% max Fe, 0.2% to 0.35% C and the balance cobalt exhibits a thermal conductivity of about 0.035 at 200° C. An alloy containing 20% to 22.5% Cr, 19% to 21% Ni, 2.5% to 3.5% Mo, 2% to 3% W, 18.5% to 21% Co, 0.75% to 1.25% Nb+Ta, 0.1% to 0.2% N, 0.2% max C and the balance Fe exhibits a thermal conductivity of about 0.035 at 200° C.

On the other hand, substantially pure nickel exhibits a heat conductivity of about 0.22. However, when chromium, for example, 15% or 20%, is added as a solute metal to the solvent or matrix metal nickel, the thermal conductivity of the nickel drops drastically to below 0.05, for example, in the neighborhood of about 0.03 to 0.04 cal/sq.cm./cm/° C/sec. For example, an alloy of 80% Ni-20% Cr exhibits a thermal conductivity of about 0.032 at 100° C. Cobalt per se exhibits a thermal conductivity of about 0.165 at ambient temperature. However, when chromium is added as a solute metal in amounts of over 10%, the thermal conductivity is drastically reduced.

Thus, when a heat and oxidation resistant alloy coating of low thermal conductivity is applied to a ferrous metal substrate having a heat conductivity of at least about 0.06, the coating adversely affects the thermal conductivity of the composite assembly.

It would be desirable to provide alloy coatings having the requisite chemical and physical properties and which consistently exhibit thermal conductivities of at least about 0.05 cal/sq.cm/cm/° C/sec and ranging upwards to 0.08 and higher.

OBJECTS OF THE INVENTION

It is an object of the invention to provide a heat, corrosion, erosion and oxidation resistant alloy coating for metal substrates characterized by a thermal conductivity of at least about 0.05 cal/sq.cm/cm/° C/sec.

Another object is to provide a composite comprising a ferrous metal substrate having a thermal conductivity at ambient temperature of at least about 0.06 cal/sq.cm/cm/° C/sec having metallurgically bonded to the surface thereof a heat, corrosion, erosion and oxidation resistant iron-group metal-base alloy and copper-base alloy selected from the group consisting of self-fluxing iron-base, nickel-base, cobalt-base and self-fluxing copper-base alloys characterized by a thermal conductivity of at least about 0.05 cal/sq.cm/cm/° C/sec.

These and other objects will more clearly appear when taken in conjunction with the following disclosure and the accompanying drawing, wherein.

SUMMARY OF THE INVENTION

Figure 1:
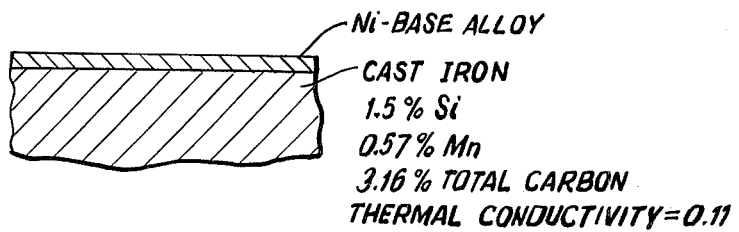
FIG. 1 is a fragment of a composite in cross section comprising a cast iron substrate, e.g. a heat exchanger element, with a nickel-base alloy coating metallurgically bonded thereto with a thermal conductivity of at least about 0.06.

According to the invention, an alloy coating is provided for application to ferrous metal substrates in which alloying ingredients making up the alloy in the case of iron-group base metals are judiciously controlled to contain proportions of refractory solute metals, e.g. W, Mo and Cr, etc., which normally substantially adversely affects the heat conductivity of the solvent metal making up substantially the main ingredient of the alloy, that is to say, the base metals Fe, Ni and Co. Copper-base alloys are also included among the coatings to be employed.

It has been found that the self-fluxing alloys are particularly applicable for carrying out the invention. These alloys are defined as iron-base, nickel-base and cobalt-base alloys containing about 0.5% to 5% boron and 0.1% to 6% silicon and up to about 3% carbon in combination with strong carbide and boride formers selected from the group of solute metals mentioned hereinabove, to wit: the refractory metals W and/or Mo and/or Cr. An advantage of the self-fluxing alloys including self-fluxing copper-base alloys, is that they provide metal coatings which are self-healing at elevated temperatures.

By judiciously controlling the relationship between the refractory solute metals, particularly chromium, and the boron and carbon present in the self-fluxing, iron-group base metal alloys, the amount of refractory solute metal going into solution with the solvent metal Fe, Ni or Co can be kept to below that amount that substantially adversely affects the thermal conductivity of the solvent metal, such as nickel. For example, an alloy of 15% Cr, 7% Fe and the balance Ni has a relatively low thermal conductivity (about 0.035) because of the presence of Cr and Fe. By lowering the amount of Cr dissolved in the nickel matrix by converting a substantial portion of the chromium to a carbide or boride so that it is removed from solid solution with the nickel, the thermal conductivity of the alloy can be upgraded to at least about 0.05 and higher and still provide a metal coating characterized by improved resistance to erosion, corrosion, wear and oxidation.

Assuming the alloy is a nickel-base alloy containing by weight 20% Cr and 80% Ni, the addition of about 3% C and 2% B will consume a substantial portion of the chromium in forming the carbide $Cr_3C_2$ and the boride CrB, the solute chromium in the compounds being in equilibrium with the residual chromium in the solvent nickel, taking into account the law of mass action.

What has been said as regards chromium applies equally to the refractory solute metals tungsten and molybdenum. One embodiment of the invention is directed to an alloy coated ferrous metal substrate in which the ferrous metal substrate has a heat conductivity relative to silver taken as 1 at substantially ambient temperature of at least about 0.06 calories/sq.cm/cm/° C/sec, the alloy coating being preferably a self-fluxing heat and corrosion resistant iron-group metal-base alloy metallurgically bonded to the ferrous metal substrate and having a thickness ranging from about 0.005 to 0.15 inch, preferably 0.01 to 0.08 inch thick. The iron-group base coating alloy contains zero to a total of up to about 30% by weight of at least one strong boride and carbide-forming solute metal selected from the group of refractory metals consisting of W, Mo and Cr, (preferably at least about 5% total), up to about 3% C, about 0.5% to 5% B, about 0.1% to 6% Si and the balance essentially said iron-group metal (Fe, Ni and Co). The amount of carbon and boron present in said alloy is controlled to be sufficient to combine stoichiometrically with a substantial portion of said refractory metal such that the alloy coating is characterized by a thermal conductivity at substantially ambient temperature relative to silver taken as 1 of at least about 0.05 calories/sq.cm/cm/° C/sec.

Examples of coating alloys which may be employed in carrying out the invention are as follows:

Table 1

| Alloy No. | Nickel-Base Alloys Percent by Weight | | | | | | |
|---|---|---|---|---|---|---|---|
| | Si | B | C | Cr | Mo | W | Ni |
| 1 | 1.5 | 1.5 | — | 5 | 3 | — | bal. |
| 2 | — | 2 | 2 | 15 | — | — | bal. |
| 3 | 2 | 1 | 1 | — | 10 | 5 | bal. |
| 4 | 2.5 | 1.5 | — | 20 | — | — | bal. |
| 5 | 1 | 1 | 3 | — | 5 | 15 | bal. |
| 6 | 2 | 2 | 2 | 10 | — | 10 | bal. |
| 7 | 1 | 4 | — | 18 | — | — | bal. |

Table 2

| Alloy No | Cobalt-Base Alloys Percent by Weight | | | | | | |
|---|---|---|---|---|---|---|---|
| | Si | B | C | Cr | Mo | W | Co |
| 8 | 1 | 1 | 2 | 15 | — | — | bal. |
| 9 | — | 2 | 3 | — | — | 15 | bal. |
| 10 | 2 | 2 | — | 18 | — | — | bal. |
| 11 | 1 | 2 | 2 | 10 | 5 | 5 | bal. |
| 12 | 1.5 | 3 | 1 | — | 10 | 8 | bal. |
| 13 | 3 | 2 | 0.5 | 12 | 5 | — | bal. |

Table 3

| Alloy No | Iron-Base Alloys PERCENT BY WEIGHT | | | | | | |
|---|---|---|---|---|---|---|---|
| | Si | B | C | Cr | Mo | W | Fe |
| 14 | 1 | 1 | 2 | 15 | — | — | balance |
| 15 | 3 | 2 | — | 10 | 5 | — | balance |
| 16 | 2 | 2 | 1 | — | 15 | 5 | balance |
| 17 | 1 | 3 | 1 | 10 | — | 10 | balance |
| 18 | 2 | 2 | 1 | 20 | 5 | — | balance |
| 19 | 0.5 | 2.5 | — | — | 5 | 10 | balance |
| 20 | 1.5 | 1.5 | 2 | 10 | — | 10 | balance |

Thus, the self-fluxing iron-group base alloy comprises about 0.1 to 6% Si, about 0.5 to 5% B, up to 3% carbon and the balance essentially an iron-group metal from the group consisting of Fe, Ni and Co. In the case of the iron-base alloy amount of nickel and/or cobalt may be present, so long as the amounts do not decrease the thermal conductivity of the iron-base alloy to below 0.05. Similarly, the nickel-base alloy may contain amounts of iron and/or nickel with substantially the same restrictions as to the thermal conductivity of the alloy.

Referring to the nickel-base alloys in Table 1, reference is made to Alloy No. 2 which contains 2% B, 2% C and 15% Cr. As chromium forms borides and carbides, a substantial portion of the solute metal chromium will be removed from solution with the nickel matrix after the coating is applied and fused in place to the ferrous metal substrate. As will be appreciated, the law of mass action will effect a redistribution of the chromium between the matrix and the boride and/or carbide reaction products, with the bulk of the chromium in the nickel matrix being reduced to substantially below 10% by weight, e.g. to 5% or below, thereby upgrading the thermal conductivity of the alloy coating relative to the ferrous metal substrate.

The boron and/or carbon are proportioned in the composition so that about 70% or more of the solute metal is combined as a compound and removed or kept from going into solid solution with the matrix alloy, the amount of solute in the matrix being substantially less than 10%.

Certain metal carbides and borides exhibit good thermal conductivities of at least about 0.05. Thus, in some instances, a two-fold effect may be obtained: (1) upgrading the thermal conductivity of the matrix alloy and (2) providing a refractory metal compound which itself may have the desired thermal conductivity.

A particularly preferred copper-base matrix alloy containing no zinc which has been found useful has the following constituents in percentages by weight as indicated:

| Constituent | Copper-Base Alloy Broad Range | Intermediate Range |
|---|---|---|
| Nickel | 10.0 – 40.0 | 15.0 – 25.0 |
| Silicon | 1.0 – 5.0 | 2.0 – 4.0 |
| Boron | 0.1 – 2.5 | 0.25 – 1.0 |
| Manganese | 0.2 – 2.0 | 0.2 – 1.0 |
| Copper | (1) | (1) |

[1]Essentially the balance

As an example of a matrix alloy within the above ranges, there may be mentioned:

| Constituents | Percent by Weight |
|---|---|
| Nickel | 23.00 |
| Silicon | 3.45 |
| Boron | 0.47 |
| Manganese | 0.75 |
| Copper | (1) |

[1]Essentially the balance

Another copper-base alloy is one containing by weight 1.5% Ni, 0.3% Cr, 0.1% Si, 0.1% B, 0.3% P, 0.02% C, 7.7% Sn and the balance copper.

In producing a metallurgically bonded alloy coating on a ferrous metal substrate, for example, on a heat exchanger element, the substrate is cleaned in the usual manner. The substrate surface is generally further prepared by grit blasting in which coarse plus 25 mesh chilled cast iron grit is employed.

The coating alloys are formulated to provide melting points ranging up to about 2500° F (1371° C), the melting points ranging from about 1800° F (983° C) to 2250° F (1233° C). The melting point is preferably controlled by the amount of silicon and boron in the alloy. The coating is applied by flame spraying an alloy powder of the composition (e.g. atomized powder). The alloy powder particle can be of a mesh size ranging from less than 125 mesh (minus 125 microns) to about 400 mesh size (about 40 microns). Mesh size referred to herein is based on U.S. Standard.

The coating is produced upon the surface of steel substrates by flame spraying utilizing flame spray torches of the type illustrated in U.S. Pat. No. 3,226,028, No. 3,262,644, No. 3,273,800 and especially a spray torch of the gravity feed type disclosed in U.S. Pat. No. 3,620,454. Example of another spray torch which may be employed is that disclosed in U.S. Pat. No. 3,986,668.

The spray torch of the latter patent is particularly useful where the powder is first sprayed onto the ferrous metal substrate followed by fusion. The torches disclosed in the first three patents may be used for simultaneously spraying and fusing the coating. Usually, the metal substrate is preheated.

The alloy coating is generally applied to the preheated metal substrate by flame spraying and the coating thereafter subjected to the flame of an oxy-acetylene torch to fuse and coalesce the coating on the tube substrate.

Tests conducted on coatings of about 0.01 inch thick have exhibited improved life compared to unprotected substrates. Large savings in downtime and maintenance costs are realized. As stated herein, the coating thickness may range from about 0.005 to 0.15 inch thick, such as 0.01 to 0.08 inch, preferably from about 0.01 to 0.05 inch.

Examples of composite structures produced in accordance with the invention are shown in FIGS. 1 to 4.

In the case of FIG. 1, the nickel-base alloy comprises about 1% Si, 2% B, 1% C, 15% Cr and the balance essentially nickel. The ferrous metal substrate is a cast iron heat exchanger element containing 1.5% Si, 0.57% Mn, 3.16% total carbon and the balance iron, the substrate having a thermal conductivity of about 0.11. The surface of the element is cleaned in the usual manner followed by grit blasting with cast iron grit and the alloy coating sprayed onto the surface and fused in place to form a coating of about 0.025 inch by playing the torch flame over the coating. During fusion and cooling, chromium compounds form, e.g. carbide, boride, so that about 70% or more of the chromium is removed or kept from entering the solvent matrix metal to provide a final coating which will exhibit a thermal conductivity of over 0.05.

Figure 2:
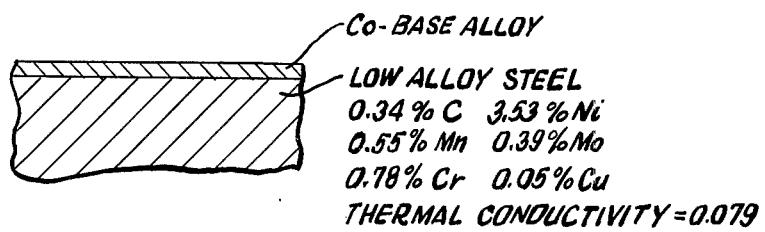
FIG. 2 is a fragmentary representation of a composite in cross section of another heat exchanger element comprising a low alloy steel substrate having an intermediate bonding coat with an outer coating of a cobalt-base heat resistant alloy metallurgically bonded thereto, said alloy coating having a thermal conductivity of at least about 0.06.

FIG. 2 is illustrative of another heat exchanger element comprising low alloy steel substrate coated with a cobalt-base alloy containing 1% Si, 2% B, 3% C, 25% Cr, 3% Ni, 4.5% W, 3% Mo and the balance essentially cobalt. The low alloy steel substrate contains 0.34% C, 0.55% Mn, 0.78% Cr, 3.53% Ni, 0.39% Mo, 0.05% Cu and the balance iron. This steel exhibits a thermal conductivity of about 0.079.

The exchanger substrate is similarly cleaned and the cobalt-base alloy is then sprayed onto the metal substrate and fused in place by playing the torch on the deposit to assure a high density fused deposit. The final coating is characterized by a cobalt alloy matrix through which borides and carbides are dispersed, the amount of chromium remaining in solution with the cobalt being sufficiently below 10% by weight to assure optimum thermal conductivity of at least about 0.05.

Figure 3:
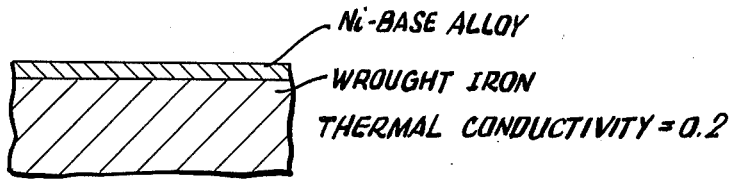
FIG. 3 is similar to FIG. 2, except that the metal substrate is wrought iron and the outer coating is a nickel-base alloy.

In FIG. 3, a wrought iron substrate is shown coated with a nickel-base alloy, the substrate having a thermal conductivity of about 0.2. The nickel-base alloy coating comprises 3% Si, 2% B, 5% Cr, 5% Mo and the balance essentially nickel. The alloy is applied similarly as for the embodiment of FIG. 2, a bond coat being first applied as shown.

The final nickel-base alloy coating will have the desired thermal conductivity by virtue of the formation of borides of the refractory solute metal chromium and molybdenum.

Figure 4:
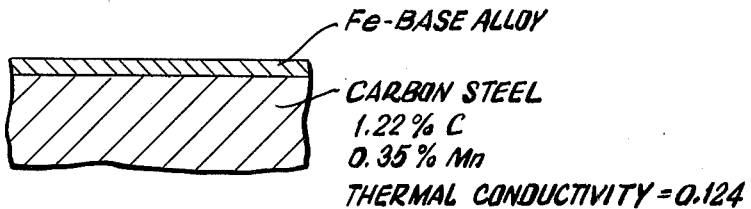
FIG. 4 shows a fragment of a carbon steel substrate with an iron-base alloy coating metallurgically bonded thereto in accordance with the invention.

FIG. 4 shows a composite in which the ferrous metal substrate is a carbon steel containing 1.22% C, 0.35% Mn and the balance iron, the steel substrate exhibiting a thermal conductivity of about 0.124. The iron-base alloy coating contains about 3% Si, 2% B, 10% Cr, 5% Mo and the balance essentially iron. This coating is applied to the carbon steel substrate similarly as described for FIG. 1.

Examples of specific alloy coatings include the following by weight: (1) 0.7% C, 15% Cr, 4.3% Si, 3.7% Fe, 3.4% B and the balance nickel; (2) 0.4% C, 2% B, 4% Si, 3.5% Fe, 11% Cr and the balance nickel; and (3) 1.5% Ni, 0.3% Cr, 0.1% Si, 0.1% B, 0.3% P, 0.02% C, 7.7% Sn and the balance copper.

As stated hereinbefore, as a result of fusion, carbides and borides are formed in situ in the matrix of the alloy coatings which helps to improve the thermal conductivity of the matrix metal of the coating. Such carbides and borides formed by reaction in the coating are referred to as secondary carbides and borides.

However, primary carbides may be added to the powder mix prior to spraying to increase further the wear resistance of the alloy coating. The primary carbides include carbides selected from the group consisting of Ti, Zr, Hf, V, Nb, Ta, Cr, Mo and W. Thus, the alloy powder may have mixed with it up to about 80% by weight of such primary carbides, for example 5% to 70% by weight of primary carbide.

Preferably, atomized self-fluxing alloy powders are employed for spraying the coating. Generally, the atomized powder has a particle size of less than 100 mesh (U.S. Standard). A desirable powder passing through 100 mesh is one in which at least 30% by weight passes through 325 mesh.

The primary refractory carbide mixed with the self-fluxing powder preferably passes through 100 mesh with at least 30% also preferably passing through 325 mesh. Usually, the primary carbide in the coating is less than about 100 microns in size, e.g. less than 50 microns.

Examples of spray powders with primary carbide mixed therewith are as follows: (1) 83% by weight of a nickel-base alloy mixed with 17% by weight of primary tungsten carbide of less than about 50 microns in size, the nickel-base alloy containing 0.7% C, 15% Cr, 4.3% Si, 3.7% Fe, 3.4% B and the balance nickel; (2) 40% by weight of a nickel-base alloy and 60% by weight of primary tungsten carbide, the nickel-base alloy containing 0.05% C, 6.9% Cr, 4.25% Si, 3.2% B, 3% Fe and the balance nickel; and (3) a self-fluxing cobalt base alloy powder containing 50% by weight of tungsten carbide mixed therewith, the cobalt-base alloy containing 1.5% B, 25% Cr, 1.5% C, 4% W, 3% Ni and the balance cobalt.

It is known that a matrix metal, such as cobalt, loaded with refractory metal carbide (primary carbides) exhibits good thermal conductivity. Thus, a sintered WC-Co composition containing 12% by weight of cobalt exhibits a thermal conductivity of $0.16/cm^2/cm/°C/sec$.

An important property of a coating is its resistance to flaking, spalling, etc. Thus, it is desirable that the relative coefficient of expansion between the final coating and the ferrous metal substrate should be within the range of plus 50% minus 30%. Assuming the ferrous metal substrate to have a coefficient of expansion referred to ambient temperature of about $11 \times 10^{-6}$ inch/inch/°C, the alloy coating may have a coefficient of expansion ranging from about 7.7 to about 16 or $17 \times 10^{-6}$ in/in/°C, provided the alloy coating is metallurgically bonded to the ferrous metal substrate.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An alloy coated ferrous metal substrate,
said ferrous metal substrate having a thermal conductivity relative to silver taken as 1 at substantially ambient temperature of at least about 0.06 calories/sq.cm./cm/° C/sec,
said alloy coating being a fused flame sprayed, self-fluxing heat and corrosion resistant iron-group metal-base alloy metalurgically bonded to said ferrous meal substrate and having a thickness ranging from about 0.005 to 0.15 inch,
said iron-group metal-base alloy consisting essentially of a total of about 5% to 30% by weight of a strong boride and carbide-forming solute metal selected from the group of refractory metals consisting of W, Mo and Cr, up to about 3% C, about 0.5% to 5% B, about 0.1% to 6% Si and the balance essentially said iron-group metal,
the amount of boron and/or carbon present in said alloy being sufficient to combine with a substantial amount of said refractory metal when present to form secondary borides and/or secondary carbides, such as to provide a coating having a thermal conductivity at substantially ambient temperature relative to silver taken as 1 of at least about 0.05 calories/sq.cm/cm/° C/sec.,
said coating also containing 0 to 80% by weight of primary refractory carbides selected from the group consisting of carbides of Ti, Zr, Hf, V, Nb, Ta, Cr, Mo and W based on the total coating.

2. The alloy coated ferrous metal substrate of claim 1, wherein said metal substrate is a heat exchanger element.

3. The alloy coated ferrous metal substrate of claim 1, wherein the coating alloy is a nickel-base alloy, and wherein the coating thickness is about 0.01 to 0.08 inch.

4. The alloy coated ferrous metal substrate of claim 1, wherein the coating alloy is a cobalt-base alloy, and wherein the coating thickness is about 0.01 to 0.08 inch.

5. The alloy coated ferrous metal substrate of claim 1, wherein the coating alloy is an iron-base alloy, and wherein the coating thickness is about 0.01 to 0.08 inch.

6. The alloy coated ferrous metal substrate of claim 1, wherein the amount of primary refractory carbide in the coating alloy ranges from about 5% to 70% by weight.

7. The alloy coated ferrous metal substrate of claim 6, wherein the primary refractory metal carbide is tungsten carbide.

8. The alloy coated ferrous metal substrate of claim 7, wherein the primary tungsten carbide in the coating has a size less than 100 microns.

* * * * *